(12) United States Patent
Kim et al.

(10) Patent No.: US 11,524,734 B2
(45) Date of Patent: Dec. 13, 2022

(54) PERSONAL MODULAR TRUNK AND MODULAR TRUNK SYSTEM EMPLOYING THE SAME

(71) Applicant: KOREA INSTITUTE OF SCIENCE AND TECHNOLOGY, Seoul (KR)

(72) Inventors: Chansoo Kim, Seoul (KR); Haneol Cho, Seoul (KR); Kyung O Baek, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 644 days.

(21) Appl. No.: 16/571,450

(22) Filed: Sep. 16, 2019

(65) Prior Publication Data

US 2020/0086937 A1 Mar. 19, 2020

(30) Foreign Application Priority Data

Sep. 14, 2018 (KR) .......................... 10-2018-0110407

(51) Int. Cl.
*B62D 59/04* (2006.01)
*B62D 63/02* (2006.01)
*G05D 1/02* (2020.01)

(52) U.S. Cl.
CPC ........... *B62D 59/04* (2013.01); *B62D 63/025* (2013.01); *G05D 1/0225* (2013.01); *G05D 2201/02* (2013.01)

(58) Field of Classification Search
CPC ...... B62D 59/04; B62D 63/025; B62D 47/00; G05D 1/0225; G05D 2201/02;
(Continued)

(56) References Cited

U.S. PATENT DOCUMENTS 7,044,348 B2 * 5/2006 McKenzie ................ B60R 7/02
224/539
8,893,604 B1 * 11/2014 Gray ........................ F41H 11/16
89/1.13
(Continued)

FOREIGN PATENT DOCUMENTS

JP 2006131044 * 5/2006
JP 2006131044 A 5/2006
(Continued)

OTHER PUBLICATIONS

Korean Office Action for Korean Application No. 10-2018-0110407 dated Sep. 19, 2019. In conformance with MPEP 609—Concise explanation of the relevance includes issue date of KR OA and references cited therein.

*Primary Examiner* — Jaime Figueroa
(74) *Attorney, Agent, or Firm* — Cantor Colburn LLP

(57) ABSTRACT

A personal modular trunk and a modular trunk system employing the personal modular trunk for reducing privacy issues and inconveniences that may arise when a vehicle is shared. The personal modular trunk includes: a trunk body; a first communication unit installed in the trunk body and configured to communicate with a vehicle; a first driving unit installed in the trunk body and configured to transport the trunk body; a first engagement unit installed in the trunk body and configured to engage or disengage with a loading space of the vehicle; and a first control unit configured to control the first communication unit to communicate with the vehicle, control the first driving unit to transport the trunk body toward the vehicle, and control the first engagement unit to engage or disengage with the loading space of the vehicle so that the trunk body is coupled to or separated from the vehicle.

15 Claims, 6 Drawing Sheets

(58) Field of Classification Search
CPC .......... G05D 2201/0211; G05D 1/0291; B60R 11/0264; B60R 5/04; B60R 16/023; H04Q 2209/40
USPC .............................................. 701/1; 180/204
See application file for complete search history.

(56) References Cited

U.S. PATENT DOCUMENTS

| | | | |
|---|---|---|---|
| 9,550,445 B2 * | 1/2017 | Holmgren | B60P 1/04 |
| 9,595,018 B2 * | 3/2017 | Carvajal | H04W 4/029 |
| 2004/0188481 A1 * | 9/2004 | McKenzie | B60R 7/08 |
| | | | 224/539 |
| 2015/0224907 A1 * | 8/2015 | Holmgren | B60P 1/04 |
| | | | 414/482 |
| 2016/0003011 A1 * | 1/2016 | Shafer | E21B 15/02 |
| | | | 166/344 |
| 2016/0019497 A1 * | 1/2016 | Carvajal | H04L 67/104 |
| | | | 705/333 |
| 2016/0237363 A1 * | 8/2016 | Murray, Sr. | C10L 3/106 |
| 2018/0022405 A1 * | 1/2018 | Gecchelin | B60D 1/481 |
| | | | 701/23 |

FOREIGN PATENT DOCUMENTS

| | | | |
|---|---|---|---|
| JP | 2007001490 A | | 1/2007 |
| JP | 2010154609 | * | 7/2010 |
| JP | 2010154609 A | | 7/2010 |
| JP | 2007001490 A | * | 5/2011 |
| KR | 101308868 B1 | | 10/2013 |

* cited by examiner

PERSONAL MODULAR TRUNK AND MODULAR TRUNK SYSTEM EMPLOYING THE SAME

CROSS-REFERENCE TO RELATED APPLICATION

The present application claims priority to Korean Patent Application No. 10-2018-0110407, filed on Sep. 14, 2018, in the Korean Intellectual Property Office, which is incorporated herein in its entirety by reference.

TECHNICAL FIELD

The present disclosure relates to a vehicle trunk and, more particularly, to a personal modular trunk that can be coupled to or separated from a vehicle. Also, the present disclosure relates to a modular trunk system employing the personal modular trunk.

BACKGROUND

Accessibility of regional transportation may be deteriorated in some regions or countries due to the decrease in population, and a concept of demand-responsive transportation has been proposed to solve the problem. The demand-responsive transportation is a transportation service system that provides transportation services in response to demands of customers without a regular 'route' and a prescribed 'schedule'. For example, in some regions in Korea, there are buses that visit each user's home. Also, in another transportation-vulnerable areas, there are taxis that are available by residents at low rates corresponding to bus fares.

Meanwhile, as the increase in a proportion of single-person households, it is expected that more people will prefer using car sharing services to purchasing their own cars which are expensive to purchase and maintain. Owing to developments of autonomous vehicle technologies with these social changes, the paradigm of transportation is expected to shift from owning vehicles to providing transportation services.

In a society in which the paradigm of transportation has been shifted from owning vehicles to providing transportation services, it would be common for many and unspecified persons to share a vehicle. In such a situation, a trunk of an existing vehicle may be inconvenient to users sharing the vehicle. That is, as items of a plurality of users are mixed in the vehicle trunk, privacy issues may arise and inconveniences in loading and finding his or her items may happen.

PRIOR ART REFERENCE

Patent Literature

Korean patent publication No. 10-1308868 published on Oct. 4, 2013

SUMMARY

In order to solve the above problems, the present disclosure provides a personal modular trunk that can be coupled to or separated from a vehicle to allow a user to carry or store personal items therein.

Also, the present disclosure provides to a modular trunk system employing at least one personal modular trunk.

According to an aspect of an exemplary embodiment, provided is a personal modular trunk including: a trunk body; a first communication unit installed in the trunk body and configured to communicate with a vehicle; a first driving unit installed in the trunk body and configured to transport the trunk body; a first engagement unit installed in the trunk body and configured to engage or disengage with a loading space of the vehicle; and a first control unit configured to control the first communication unit to communicate with the vehicle, control the first driving unit to transport the trunk body toward the vehicle, and control the first engagement unit to engage or disengage with the loading space of the vehicle so that the trunk body is coupled to or separated from the vehicle.

The personal modular trunk may further include: a first positioning unit installed in the trunk body. The first control unit may control the first positioning unit to measure a position of the personal modular trunk and control the coupling or separation between the vehicle and the trunk body based on position information.

The personal modular trunk may further include: a connection unit installed in the trunk body. The first control unit may control the connection unit, such that the connection unit is coupled to or separated from a connection unit of another personal modular trunk.

According to an aspect of another exemplary embodiment, provided is modular trunk system including: a vehicle comprising a loading space formed in one side; and a personal modular trunk configured to communicate with the vehicle, move toward the vehicle to be coupled to the loading space, and be separated from the loading space.

The personal modular trunk may include: a trunk body; a first communication unit installed in the trunk body and configured to communicate with the vehicle; a first driving unit installed in the trunk body and configured to transport the trunk body; a first engagement unit installed in the trunk body and configured to engage or disengage with the loading space of the vehicle; and a first control unit configured to control the first communication unit to communicate with the vehicle, control the first driving unit to transport the trunk body toward the vehicle, and control the first engagement unit to engage or disengage with the loading space of the vehicle so that the trunk body is coupled to or separated from the vehicle.

The personal modular trunk may further include: a first positioning unit installed in the trunk body. The first control unit may control the first positioning unit to measure a position of the personal modular trunk and control the coupling or separation between the vehicle and the trunk body based on position information of the personal modular trunk.

The vehicle may include: a vehicle body; a second communication unit installed in the vehicle body and configured to communicate with the personal modular trunk; a second engagement unit installed in the vehicle body and configured to engage or disengage with the personal modular trunk; and a second control unit configured to control the second communication unit to communicate with the personal modular trunk, and control the second engagement unit to engage or disengage with the personal modular trunk so that the trunk body is coupled to or separated from the vehicle.

The second communication unit may use a short-range wireless communication scheme or a mobile communication scheme for communications with the personal modular trunk.

The vehicle may further include a second positioning unit installed in the vehicle body. The second control unit may control the second positioning unit to measure a position of the vehicle and control the coupling or separation between the vehicle and the trunk body based on position information of the vehicle.

The second control unit may control the second communication unit to transmit the position information of the vehicle to the personal modular trunk. The first communication unit may receive the position information of the vehicle from the vehicle. The first control unit may control the first positioning unit to measure a position of the personal modular trunk, and control the first driving unit to transport the trunk body toward the vehicle based on the position information of the vehicle and the position information of the personal modular trunk.

The personal modular trunk may further include: a first positioning unit installed in the trunk body. The first control unit may control the first positioning unit to measure a position of the personal modular trunk, and control the first communication unit to transmit the position information of the personal modular trunk to the vehicle. The second communication unit may receive the position information of the personal modular trunk. The second control unit may control the second positioning unit to measure the position of the vehicle, and control the second communication unit to transmit a movement command signal to the personal modular trunk based on the position information of the personal modular trunk and the position information of the vehicle. The first communication unit may receive the movement command signal. The first control unit may control the first driving unit to transport the trunk body toward the vehicle based on the movement command signal.

The first control unit may control the first engagement unit to approach to the second engagement unit and be coupled to the second engagement unit.

The second control unit may control the second engagement unit to approach to the first engagement unit and be coupled to the first engagement unit.

According to the present disclosure, the trunk may move based on communications with the vehicle and can be coupled to or separated from the vehicle. The modular trunk system may employ a plurality of personal modular trunks, each of which may be used by a separate user. Thus, the present disclosure may reduce the privacy issues and inconveniences in loading and finding his or her items that may happen when many and unspecified persons share the vehicle.

BRIEF DESCRIPTION OF THE DRAWINGS

In order that the disclosure may be well understood, there will now be described various forms thereof, given by way of example, reference being made to the accompanying drawings, in which.

Figure 1:
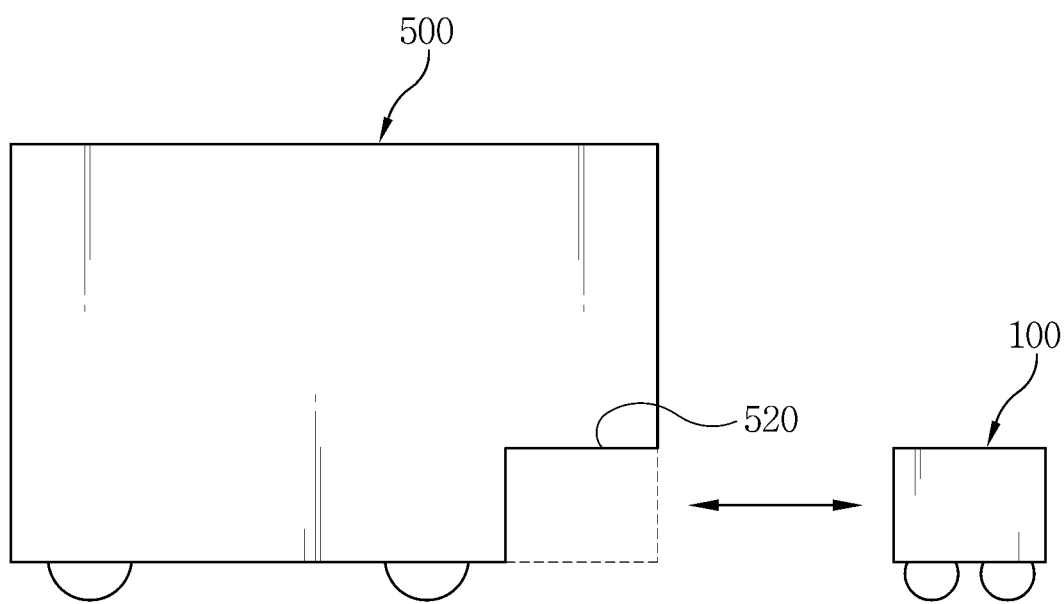
FIG. 1 illustrates a modular trunk system according to an exemplary embodiment of the present disclosure.

The drawings described herein are for illustration purposes only and are not intended to limit the scope of the present disclosure in any way.

DETAILED DESCRIPTION

In the following description and the accompanied drawings, only parts necessary for understanding embodiments of the present disclosure will be described, and the descriptions of well-known functions or configurations that may obscure the subject matter of the present disclosure will be omitted for simplicity.

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure and are not intended to limit the technical idea of the present disclosure. Therefore, it should be understood that there may exist various equivalents and modifications which may substitute the exemplary embodiments at the time of filing of the present application.

A personal modular trunk and a modular trunk system according to the present disclosure will now be described in more detail with reference to attached drawings.

First Embodiment

FIG. 1 illustrates the modular trunk system according to an exemplary embodiment of the present disclosure.

Referring to FIG. 1, the modular trunk system according to an exemplary embodiment of the present disclosure includes a vehicle 500 and a personal modular trunk 100. The vehicle 500 includes a loading space 520 formed in a side thereof. The personal modular trunk 100 can communicate with the vehicle 500 and move toward the vehicle 500 to be coupled to the loading space 520 or be separated from the loading space 520.

The vehicle 500 includes the loading space 520 and components for coupling with or separating from the personal modular trunk 100. While the loading space of an existing vehicle is formed to allow opening and closing at a rear portion of the vehicle, the loading space 520 of the vehicle 500 according to the exemplary embodiment of the present disclosure may be formed as an empty space open externally to allow the personal modular trunk 100 to be coupled to or separated from the loading space 520.

Although the loading space 520 is shown in FIG. 1 to be arranged at a rear end of the vehicle 500 by way of example, the technical idea of the present disclosure is not limited thereto. In other words, the loading space 520 may be formed at any of various positions of the vehicle 500.

The personal modular trunk 100 includes a compartment for loading at least one item of a user. Also, the personal modular trunk 100 further includes components for coupling to or separating from the loading space 520 of the vehicle 500.

Figure 2:
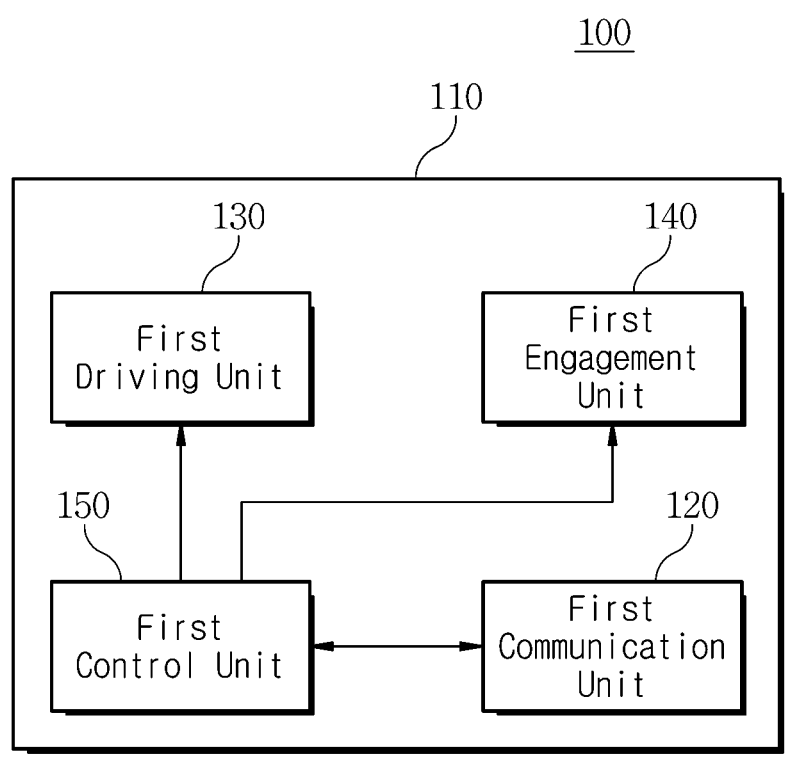
FIG. 2 is a block diagram of a personal modular trunk according to a first embodiment of the present disclosure.

The components of the personal modular trunk 100 will now be described with reference to FIGS. 1 and 2. FIG. 2 is a block diagram of the personal modular trunk 100 according to a first embodiment of the present disclosure.

The personal modular trunk 100 according to the first embodiment of the present disclosure may include a trunk body 110, a first communication unit 120, a first driving unit 130, a first engagement unit 140, and a first control unit 150.

The trunk body 110 provides a space for loading the item or luggage of the user. The first communication unit 120 may communicate with the vehicle 500. The first driving unit 130 may be installed at the trunk body 110 and may transport the trunk body 110. The first engagement unit 140 enables the trunk body 110 to be coupled to or separated from the loading space 520 of the vehicle 500. The first control unit 150 controls the first communication unit 120 to communicate with the vehicle 500, controls the first driving unit 130 to transport the trunk body 110 toward the vehicle 500, and controls the first engagement unit 140 to be coupled to or separated from the loading space 520 of the vehicle 500 so as to enable the trunk body 110 to be coupled to or separated from the vehicle 500.

The trunk body 110 may include a compartment for loading the item or luggage of the user, and the other components of the personal modular trunk 100 is installed at the trunk body 110.

The first communication unit 120 may transmit and receive signals, under the control of the first control unit 150, that may be used for the coupling or separation of the personal modular trunk 100 to and from the vehicle 500. The first communication unit 120 may include a receiver (not shown) for receiving a signal from the vehicle 500 and a transmitter (not shown) for transmitting a signal to the vehicle 500. The first communication unit 120 may use mobile communications such as the third generation (3G) and the fourth generation (4G) broadband cellular communications or short-range wireless communications such as Bluetooth to transmit and receive the signals.

The first driving unit 130 may move the trunk body 110 by using a power from a driving source under the control of the first control unit 150. The driving source may include a motor controller (not shown) and an electrical drive motor (not shown), for example. The first driving unit 130 may include a driving mechanism (not shown) that operates by the output power of the driving source to enable the movement of the trunk body 110. For example, the driving mechanism may include a plurality of wheels and at least one chain.

The first driving unit 130 may further include a lifting unit (not shown) which lifts the driving mechanism to be spaced apart from ground or and lowers the driving mechanism to contact the ground, under the control of the first control unit 150, in a state that the trunk body 110 is coupled to the loading space 520 of the vehicle 500.

The first engagement unit 140 may engage or disengage with a second engagement unit in the vehicle under the control of the first control unit 150. The first engagement unit 140 may include a fastening member such as a bolt or a nut, but the present disclosure is not limited thereto and any member or part capable of allowing the engagement and disengagement with the second engagement unit may be used as the first engagement unit 140. For example, a fastening member such as a loop or a hook, or a magnet may be used as the first engagement unit 140.

The first control unit 150 controls each component of the personal modular trunk 100 so that the personal modular trunk 100 is coupled to or separated from the vehicle 500. The first control unit 150 may operate according to a process prescribed in a program stored and executed by the first control unit 150, but the present disclosure is not limited thereto. For example, the first control unit 150 may receive a command from the user's mobile device (not shown) or the vehicle 500 to control each component of the personal modular trunk 100 according to the command.

The coupling of the personal modular trunk 100 to the vehicle 500 is performed as follows under the control of the first control unit 150.

First, the first control unit 150 controls the first communication unit 120 to communicate with the vehicle 500.

Next, the first communication unit 120 controls the first driving unit 130, based on the signal which the first communication unit 120 received from the vehicle 500, to transport the trunk body 110 toward the vehicle 500 till the trunk body 110 reaches the loading space 520 of the vehicle 500.

Finally, the first control unit 150 controls the first engagement unit 140 to be coupled to the loading space 520 of the vehicle 500.

On the other hand, the separation of the personal modular trunk 100 from the vehicle 500 may be performed in a reverse order of the coupling sequence described above.

Figure 3:
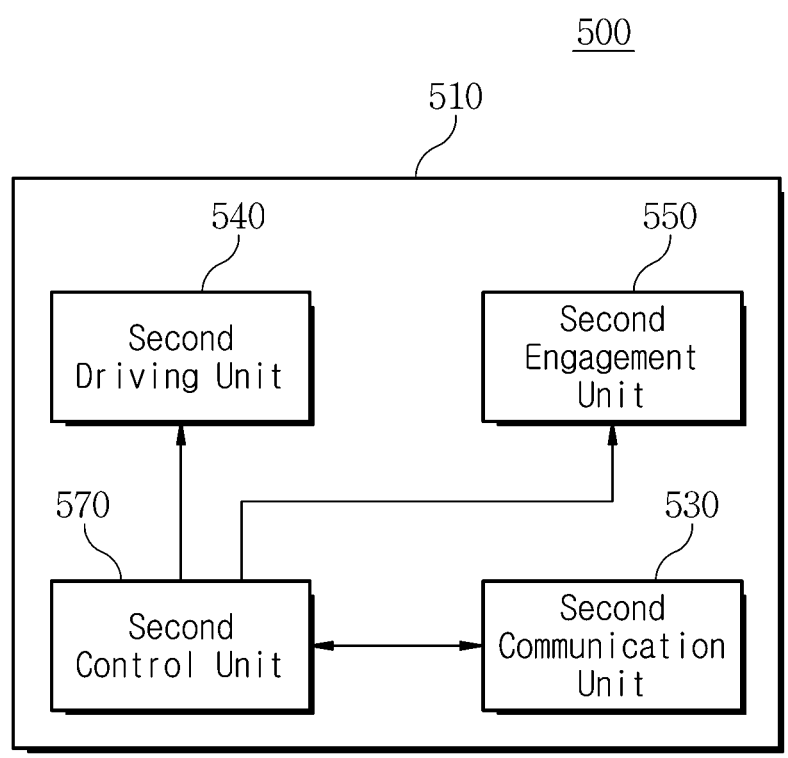
FIG. 3 is a block diagram of a vehicle according to a first embodiment of the present disclosure.

The configuration of the vehicle 500 which allows the coupling and separation of the personal modular trunk 100 according to the first embodiment of the present disclosure will now be described with reference to FIGS. 1-3. FIG. 3 is a block diagram of the vehicle 500 according to the first embodiment of the present disclosure.

The vehicle 500 according to the first embodiment of the present disclosure may include a vehicle body 510, a second communication unit 530, a second engagement unit 550, and a second control unit 570. The second communication unit 530, which is installed in the vehicle body 510, may communicate with the personal modular trunk 100. The second engagement unit 550 is installed in the vehicle body 510 and may engage or disengage with the first engagement unit 140 of the personal modular trunk 100. The second control unit 570 controls the second communication unit 530 to communicate with the personal modular trunk 100, controls the second engagement unit 550 to engage or disengage with the first engagement unit 140 so that the personal modular trunk 100 is coupled to or separated from the vehicle 500.

The vehicle 500 according to the first embodiment of the present disclosure may further include a second driving unit 540 as necessary. The second driving unit 540 may be installed in the vehicle body 510 and may transport the vehicle body 510 under the control of the second control unit 570.

The vehicle body 510 includes the loading space 520, as mentioned above, and is equipped with components to enable the coupling of the personal modular trunk 100.

The second communication unit 530 transmits and receives signals, under the control of the second control unit 570, for facilitating the coupling or separation between the personal modular trunk 100 and the vehicle 500, The second communication unit 530 may include a receiver (not shown) for receiving a signal from personal modular trunk 100 and a transmitter (not shown) for transmitting a signal to the personal modular trunk 100. The first second communication unit 530 may use mobile communications such as the 3G and 4G broadband cellular communications or the short-range wireless communications such as Bluetooth to transmit and receive the signals.

The second engagement unit 550 may engage or disengage with the first engagement unit 140 under the control of the second control unit 570. The second engagement unit 550 may include a fastening member such as a bolt or a nut. Here, the bolt may be used as the second engagement unit 550 while the nut may be used as the first engagement unit 140, or vice versa. However, the fastening member is not limited thereto and any member or part capable of allowing the engagement and disengagement between the second engagement unit 550 and the first engagement unit 140 may be used as the second engagement unit 550. For example, a fastening member such as a loop or a hook, or a magnet may be used as the second engagement unit 550.

In addition, the second engagement unit 530 may further include an engagement checking unit (not shown) configured to check whether the first engagement unit 140 engages properly with the second engagement unit 530. For example, the engagement checking unit may check the engagement by measuring an electrical conductivity of a path through the first engagement unit 140 and the second engagement unit 530. Alternatively, the engagement checking unit may include a switch which is switched mechanically depending on a coupling state. The engagement checking unit may provide the coupling state information to the second control unit 570.

The second control unit 570 may be a microprocessor that controls each component of the vehicle 500 so that the personal modular trunk 100 is coupled to or separated from the vehicle 500, The second control unit 570 may be an electronic control unit (ECU) of the vehicle 500. Alternatively, however, or the second control unit 570 may include a microprocessor, separate from the ECU, for controlling the coupling or separation between the vehicle 500 and the personal modular trunk 100.

The second control unit 570 may control the second communication unit 530 to communicate with the personal modular trunk 100, and control the operation of the second engagement unit 550 based on the signals transmitted to or received from the personal modular trunk 100. The second control unit 570 may control the second driving unit 540 to transport the vehicle body 510 as necessary.

The second driving unit 540 may move the vehicle body 510 by using a power from a driving source (not shown) under the control of the second control unit 570. The driving source may be an engine of the vehicle 500, for example. The second driver 540 may include a driving mechanism (not shown) that operates by the output power of the driving source to enable the movement of the vehicle body 510. For example, the driving mechanism may include a plurality of wheels.

The movement of the personal modular trunk 100 toward the vehicle 500 may be achieved by a dominant operation of the personal modular trunk 100 or passively in response to a signal from the vehicle 500.

The movement of the personal modular trunk 100 by the dominant operation of the personal modular trunk 100 may be accomplished as follows.

First, the first control unit 150 controls the first communication unit 120 to transmit a drive request signal to the vehicle 500, and the second communication unit 530 receives the drive request signal. Here, the drive request signal refers to a signal that the personal modular trunk 100 requests a permission to move toward the vehicle 500.

Next, the second control unit 570 controls the second communication unit 530 to transmit a response signal to the personal modular trunk 100, and the first communication unit 120 receives the response signal. Here, the response signal is provided in response to the drive request signal and refers to a signal that approves the movement of the personal modular trunk 100.

Finally, the first control unit 150 controls the first driving unit 130 to transport the trunk body 110 toward the vehicle 500.

On the other hand, the passive movement of the personal modular trunk 100 in response to the signal from the vehicle 500 may be accomplished as follows.

First, the second control unit 570 controls the second communication unit 530 to transmit a movement command signal to the personal modular trunk 100, and the first communication unit 120 receives the movement command signal. The movement command signal refers to a signal instructing the personal modular trunk 100 to move toward the vehicle 500.

In response to the movement command signal, the first control unit 150 controls the first driving unit 130 to transport the trunk body 110 toward the vehicle 500.

Meanwhile, after the personal modular trunk 100 moved to the vehicle 500 through any of the two methods, the coupling of the personal modular trunk 100 to the vehicle 500 may be led by the personal modular trunk 100 or the vehicle 500.

In case that the coupling is led by the personal modular trunk 100, the first engagement unit 140 approaches to the second engagement unit 550 and engages with the second engagement unit 550, and the first control unit 150 controls the operation of the first engagement unit 140.

In case that the coupling is led by the vehicle 500, the second engagement unit 550 approaches to the first engagement unit 140 and engages with the first engagement unit 140, and the second control unit 570 controls the operation of the second engagement unit 550.

Second Embodiment

Although the personal modular trunk 100 and the vehicle 500 according to the first embodiment of the present disclosure do not include any position measuring devices, such devices may be incorporated in the personal modular trunk and the vehicle. That is, as shown in FIGS. 4 and 5, a personal modular trunk 200 and a vehicle 600 according to a second embodiment of the present disclosure may include positioning units 160 and 590, respectively.

Figure 4:
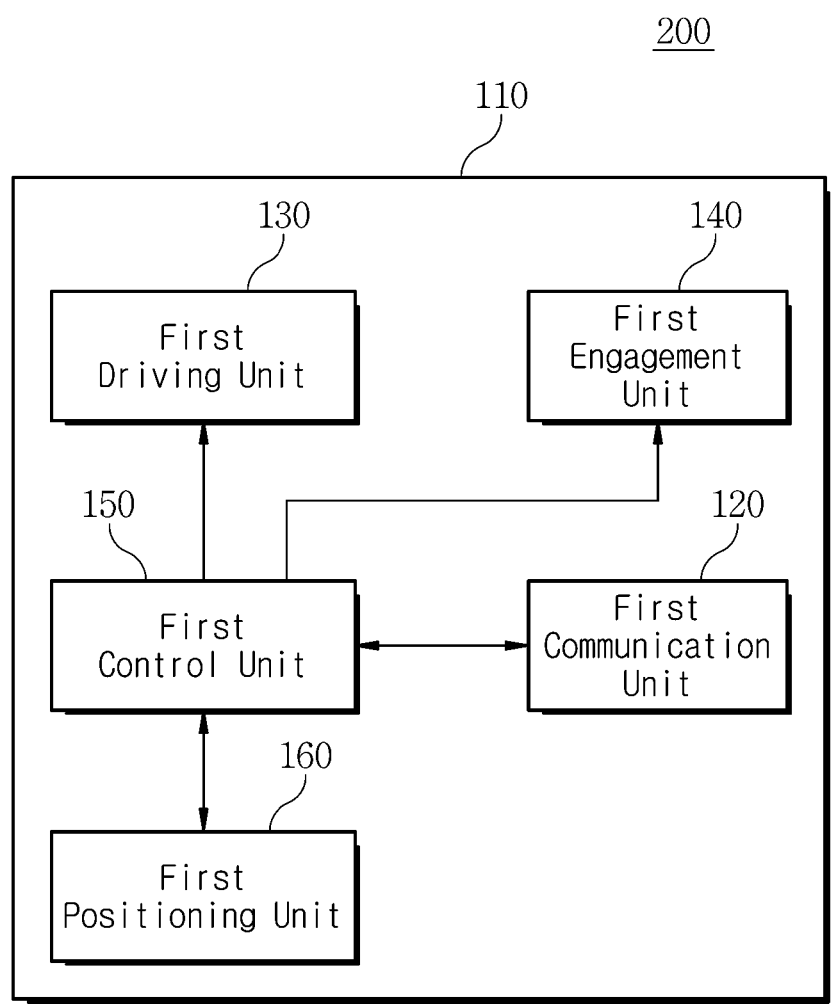
FIG. 4 is a block diagram of the personal modular trunk according to a second embodiment of the present disclosure.
Figure 5:
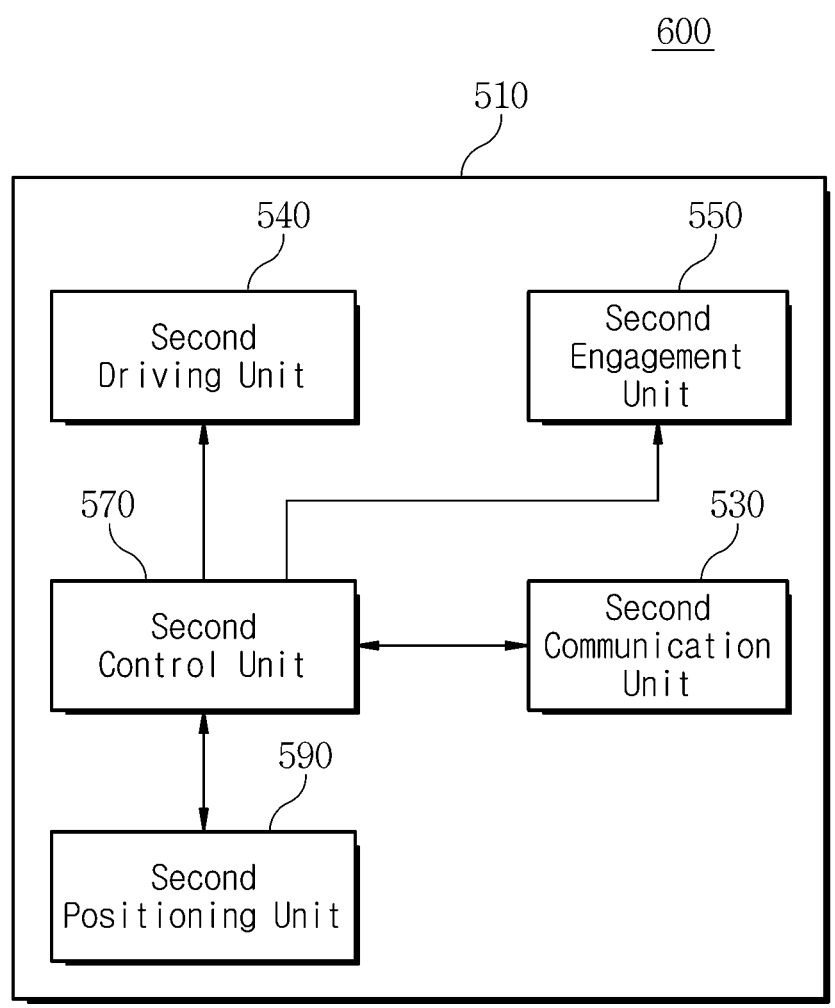
FIG. 5 is a block diagram of the vehicle according to a second embodiment of the present disclosure.

FIG. 4 is a block diagram of the personal modular trunk according to the second embodiment of the present disclosure, and FIG. 5 is a block diagram of the vehicle according to the second embodiment of the present disclosure.

Referring to FIG. 4, the personal modular trunk 200 according to the second embodiment of the present disclosure may include the trunk body 110, the first communication unit 120, the first driving unit 130, the first engagement unit 140, the first control unit 150, and the first positioning unit 160. The configuration of the personal modular trunk 200 according to the second embodiment is similar to that of the personal modular trunk 100 according to the first embodiment except for the first positioning unit 160. Thus, duplicate descriptions for the corresponding members in the two embodiments will be omitted for simplicity, and the description will focus on the first the positioning unit 160.

The first positioning unit 160 is installed in the trunk body 110 and measures a position of the personal modular trunk 200 under the control of the first control unit 150. The first positioning unit 160 may include a GPS module. However, the present disclosure is not limited thereto, and another positioning method among various positioning methods may be employed instead of or in addition to simply using GPS signals. Since details of a specific positioning method can be readily implemented by those having ordinary skills in the art, a detailed description thereof will be omitted.

The first control unit 150 may control the coupling or separation between the vehicle 600 and the personal modular trunk 200 based on position information of the personal modular trunk 200 acquired by the first positioning unit 160.

Referring to FIG. 5, the vehicle 600 according to the second embodiment of the present disclosure may include the vehicle body 510, the second communication unit 530, the second engagement unit 550, and the second positioning unit 590. The configuration of the vehicle 600 according to the second embodiment is similar to that of the vehicle 500 according to the first embodiment except for the second positioning unit 590. Thus, duplicate descriptions for the corresponding members in the two embodiments will be omitted for simplicity, and the description will focus on the second positioning unit 590.

The second positioning unit 590 is installed in the vehicle body 510 and measures a position of the vehicle 600 under the control of the second control unit 570. The second positioning unit 590 may include the GPS module. However, the present disclosure is not limited thereto, and another positioning method among various positioning methods may be employed instead of or in addition to simply using GPS signals. Since details of a specific positioning method can be readily implemented by those having ordinary skills in the art, a detailed description thereof will be omitted.

The second control unit 570 may control the coupling or separation between the vehicle 600 and the personal modular trunk 200 based on position information of the vehicle 600 acquired by the second positioning unit 590.

The movement of the personal modular trunk 200 toward the vehicle 600 may be achieved by a dominant operation of the personal modular trunk 200 or passively in response to a signal from the vehicle 600.

The movement of the personal modular trunk 200 by the dominant operation of the personal modular trunk 200 may be accomplished as follows.

First, the second control unit 570 controls the second positioning unit 590 to measure the position of the vehicle 600.

Subsequently, the second control unit 570 controls the second communication unit 530 to transmit position information of the vehicle 600 to the personal modular trunk 200, and the first communication unit 120 receives the position information.

Next, the first control unit 150 controls the first positioning unit 160 to measure the position of the personal modular trunk 200.

Finally, the first control unit 150 controls the first driving unit 130 to transport the trunk body 110 to the vehicle 600 based on the position information of the vehicle 600 and the personal modular trunk 200.

On the other hand, the passive movement of the personal modular trunk 200 in response to the signal from the vehicle 600 may be accomplished as follows.

First, the first control unit 150 controls the first positioning unit 160 to measure the position of the personal modular trunk 200.

Subsequently, the first control unit 150 controls the first communication unit 120 to transmit the position information of the personal modular trunk 200 to the vehicle 600, and the first communication unit 120 receives the position information.

Next, the second control unit 570 controls the second positioning unit 590 to measure the position of the vehicle 600.

Afterwards, the second control unit 570 controls the second communication unit 530 to transmit a movement command signal to the personal modular trunk 100 based on the position information of the personal modular trunk 200 and the vehicle 600, and the first communication unit 120 receives the movement command signal. The movement command signal refers to a signal instructing the personal modular trunk 200 to move toward the vehicle 600.

Finally, the first control unit 150 controls the first driving unit 130 to transport the trunk body 110 toward the vehicle 600.

Meanwhile, the procedure for the coupling of the personal modular trunk 200 to the vehicle 600 after the movement of the personal modular trunk 100 to the vehicle 600 is similar to that described above for the first embodiment and is omitted for simplicity.

Third Embodiment

Although the personal modular trunk 100 and 200 according to the first and second embodiment of the present disclosure do not include any configuration for joining a plurality of personal modular trunks, such configuration may be incorporated in the personal modular trunk. That is, as shown in FIG. 6, a personal modular trunk 300 according to a third embodiment of the present disclosure may include a connection unit 170 installed in the trunk body.

Figure 6:
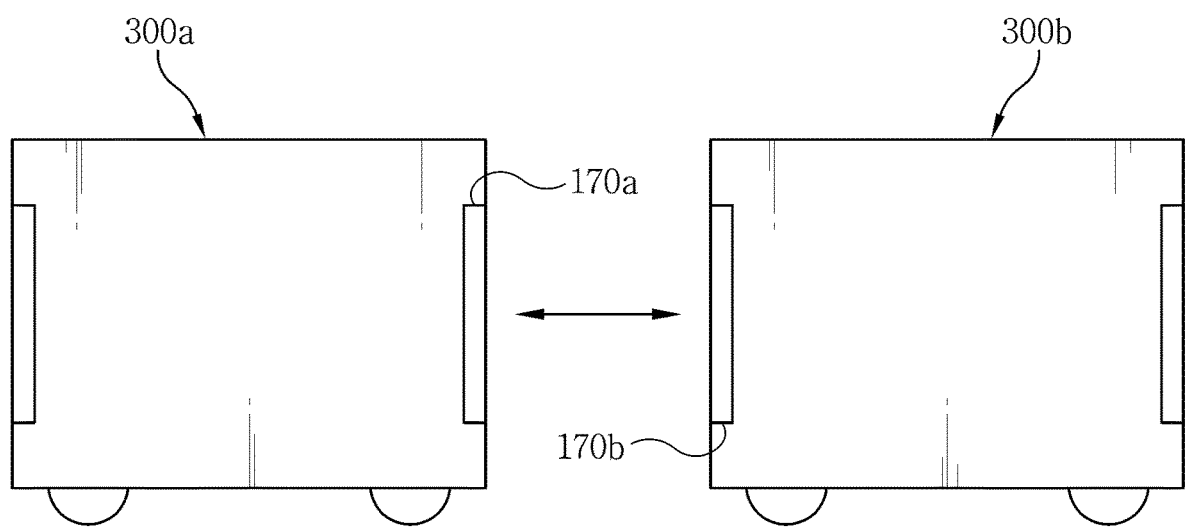
FIG. 6 illustrates coupling and decoupling between personal modular trunks through connection units according to a third embodiment of the present disclosure.

FIG. 6 illustrates coupling and decoupling between personal modular trunks through the connection units according to the third embodiment of the present disclosure.

Referring to FIG. 6, the personal modular trunk 300 according to the third embodiment of the present disclosure includes the trunk body, the first communication unit, the first driving unit, the first engagement unit, the first control unit, and the connection unit 170. Since the configuration of the personal modular trunk 300 according to the third embodiment is similar to that of the personal modular trunk 100 according to the first embodiment except for the connection unit 170, duplicate descriptions for the corresponding members in the two embodiments will be omitted for simplicity and the following description will focus on the connection unit 170.

The connection unit 170a of one personal modular trunk 300a may be coupled to or separated from the connection unit 170b of another personal modular trunk 300b under the control of the first control unit. Accordingly, a plurality of personal modular trunks 300a and 300b may be loaded into or unloaded from one vehicle.

The connection unit 170 may include a fastening member such as a bolt or a nut, but the present disclosure is not limited thereto and any member or part capable of allowing the engagement and disengagement between the connection units 170 may be used as the connection unit 170. For example, a fastening member such as a loop or a hook, or a magnet may be used as the connection unit 170.

In addition, the connection unit 170 may further include an engagement checking unit (not shown) configured to check whether the connection units 170 are properly coupled to each other. For example, the engagement checking unit may check the coupling by measuring the electrical conductivity of a path through the connection units 170. Alternatively, the engagement checking unit may include a switch which is switched mechanically depending on the coupling state of the connection units 170.

Even though the connection unit 170 is illustrated in FIG. 6 as being located in front and rear faces in each trunk body, the present disclosure is not limited thereto and the connection unit 170 may be provided at the other position of the personal modular trunk 300.

The description of the disclosure is merely exemplary in nature and, thus, variations that do not depart from the substance of the disclosure are intended to be within the scope of the disclosure. Such variations are not to be regarded as a departure from the spirit and scope of the disclosure. Also, it is to be understood that the terms are used herein are for the purpose of describing the present disclosure only and are not intended to limit the scope of the present disclosure.

What is claimed is:

1. A personal modular trunk comprising:
a trunk body;
a first communication unit installed in the trunk body and configured to communicate with a vehicle;
a first driving unit installed in the trunk body and configured to transport the trunk body;
a first engagement unit installed in the trunk body and configured to engage or disengage with a loading space of the vehicle;
a first control unit configured to control the first communication unit to communicate with the vehicle, control the first driving unit to transport the trunk body toward the vehicle, and control the first engagement unit to engage or disengage with the loading space of the vehicle so that the trunk body is coupled to or separated from the vehicle; and
a lifting unit configured to lift one or more wheels of the first driving unit responsive to the trunk body being coupled to the loading space of the vehicle.

2. The personal modular trunk of claim 1, further comprising:
a first positioning unit installed in the trunk body,
wherein the first control unit controls the first positioning unit to measure a position of the personal modular trunk and controls the coupling or separation between the vehicle and the trunk body based on position information.

3. The personal modular trunk of claim 1, further comprising:
a connection unit installed in the trunk body,
wherein the first control unit controls the connection unit, such that the connection unit is coupled to or separated from a connection unit of another personal modular trunk.

4. A modular trunk system comprising:
a vehicle comprising a loading space formed in one side; and
a personal modular trunk configured to communicate with the vehicle, move toward the vehicle to be coupled to the loading space, and be separated from the loading space;
wherein the personal modular trunk comprises:
a trunk body;
a first driving unit installed in the trunk body and configured to transport the trunk body; and
a lifting unit configured to lift one or more wheels of the first driving unit responsive to the trunk body being coupled to the loading space of the vehicle.

5. The modular trunk system of claim 4, wherein the personal modular trunk further comprises:
a first communication unit installed in the trunk body and configured to communicate with the vehicle;
a first engagement unit installed in the trunk body and configured to engage or disengage with the loading space of the vehicle; and
a first control unit configured to control the first communication unit to communicate with the vehicle, control the first driving unit to transport the trunk body toward the vehicle, and control the first engagement unit to engage or disengage with the loading space of the vehicle so that the trunk body is coupled to or separated from the vehicle.

6. The modular trunk system of claim 5, wherein the personal modular trunk further comprises:
a first positioning unit installed in the trunk body,
wherein the first control unit controls the first positioning unit to measure a position of the personal modular trunk and controls the coupling or separation between the vehicle and the trunk body based on position information of the personal modular trunk.

7. The modular trunk system of claim 5, wherein the vehicle comprises:
a vehicle body;
a second communication unit installed in the vehicle body and configured to communicate with the personal modular trunk;
a second engagement unit installed in the vehicle body and configured to engage or disengage with the personal modular trunk; and
a second control unit configured to control the second communication unit to communicate with the personal modular trunk, and control the second engagement unit to engage or disengage with the personal modular trunk so that the trunk body is coupled to or separated from the vehicle.

8. The modular trunk system of claim 7, wherein the second communication unit uses a short-range wireless communication scheme or a mobile communication scheme for communications with the personal modular trunk.

9. The modular trunk system of claim 7, wherein the vehicle further comprises:
a second positioning unit installed in the vehicle body,
wherein the second control unit controls the second positioning unit to measure a position of the vehicle and controls the coupling or separation between the vehicle and the trunk body based on position information of the vehicle.

10. The modular trunk system of claim 9,
wherein the second control unit controls the second communication unit to transmit the position information of the vehicle to the personal modular trunk,
wherein the first communication unit receives the position information of the vehicle from the vehicle,
wherein the first control unit controls the first positioning unit to measure a position of the personal modular trunk, and controls the first driving unit to transport the trunk body toward the vehicle based on the position information of the vehicle and the position information of the personal modular trunk.

11. The modular trunk system of claim 9, wherein the personal modular trunk further comprises:
a first positioning unit installed in the trunk body,
wherein the first control unit controls the first positioning unit to measure a position of the personal modular trunk, and controls the first communication unit to transmit the position information of the personal modular trunk to the vehicle,
wherein the second communication unit receives the position information of the personal modular trunk,
wherein the second control unit controls the second positioning unit to measure the position of the vehicle, and controls the second communication unit to transmit a movement command signal to the personal modular trunk based on the position information of the personal modular trunk and the position information of the vehicle, wherein the first communication unit receives the movement command signal,
wherein the first control unit controls the first driving unit to transport the trunk body toward the vehicle based on the movement command signal.

12. The modular trunk system of claim 10, wherein the first control unit controls the first engagement unit to approach to the second engagement unit and be coupled to the second engagement unit.

13. The modular trunk system of claim 11, wherein the first control unit controls the first engagement unit to approach to the second engagement unit and be coupled to the second engagement unit.

14. The modular trunk system of claim 10, wherein the second control unit controls the second engagement unit to approach to the first engagement unit and be coupled to the first engagement unit.

15. The modular trunk system of claim 11, wherein the second control unit controls the second engagement unit to approach to the first engagement unit and be coupled to the first engagement unit.

* * * * *